(12) United States Patent
Kussmaul et al.

(10) Patent No.: US 7,822,761 B2
(45) Date of Patent: Oct. 26, 2010

(54) GROUPWARE SYSTEM WITH IMPROVED CONTACT DATA HANDLING

(75) Inventors: Timo Kussmaul, Boeblingen (DE);
Hendrik Haddorp, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 11/832,017

(22) Filed: Aug. 1, 2007

(65) Prior Publication Data

US 2008/0243789 A1    Oct. 2, 2008

(30) Foreign Application Priority Data

Oct. 18, 2006    (EP)    ................................ 06122488

(51) Int. Cl.
*G06F 7/06* (2006.01)
(52) U.S. Cl. ...................................... 707/759; 707/723
(58) Field of Classification Search .................. None
See application file for complete search history.

(56) References Cited

U.S. PATENT DOCUMENTS

| | | | | |
|---|---|---|---|---|
| 6,269,369 | B1 * | 7/2001 | Robertson | 707/10 |
| 7,353,252 | B1 * | 4/2008 | Yang et al. | 709/204 |
| 2002/0016857 | A1 * | 2/2002 | Harari | 709/238 |
| 2004/0252819 | A1 * | 12/2004 | Miyata | 379/201.01 |
| 2006/0195494 | A1 * | 8/2006 | Dietrich | 708/110 |
| 2007/0067439 | A1 * | 3/2007 | Mason et al. | 709/224 |
| 2007/0100845 | A1 * | 5/2007 | Sattler et al. | 707/100 |
| 2007/0106698 | A1 * | 5/2007 | Elliott et al. | 707/200 |
| 2007/0255683 | A1 * | 11/2007 | Cox | 707/2 |
| 2008/0256107 | A1 * | 10/2008 | Banga et al. | 707/102 |
| 2008/0304644 | A1 * | 12/2008 | Mishra et al. | 379/201.12 |

* cited by examiner

*Primary Examiner*—Neveen Abel Jalil
*Assistant Examiner*—Kellye D Buckingham
(74) *Attorney, Agent, or Firm*—Raymond Szeto; Hoffman Warnick LLC

(57) ABSTRACT

A groupware computer system comprising a groupware server, a groupware client coupled to the server over a network, a contact information repository configured to store contact data of users in personal contact lists associated to individual users, a messaging system database configured to store statistical information about exchange of messages, a contact management module coupled to the contact information repository and configured to create, modify and retrieve contact data of users, a functional component for automatic determination of contact information (ADCI), and a groupware server computer, groupware client computer, a method, data processing program, computer program product, and computer data signal therefore.

13 Claims, 5 Drawing Sheets

GROUPWARE SYSTEM WITH IMPROVED CONTACT DATA HANDLING

TECHNICAL FIELD

The invention relates to a groupware computer system comprising a groupware server, a groupware client coupled to the server over a network, a contact information repository configured to store contact data of users in personal contact lists associated with individual users, a messaging system database configured to store statistical information about exchange of messages, a contact management module coupled to the contact information repository and configured to create, modify, and retrieve contact data of users, and a groupware server computer, groupware client computer, a method, data processing program, computer program product, and computer data signal therefore.

BACKGROUND

Groupware systems facilitate the collaboration of a number of computer users to collaborate in groups, for instance by enabling users to exchange electronic messages, such as emails or instant messaging. Some groupware systems offer functionality to edit, store, and retrieve information about groupware system users particularly for the purpose of such electronic messaging. Contact data handled by such contact management functionality typically comprise machine-readable identifiers and addresses of groupware system users, such as email addresses or instant messaging identifiers, and further personal information about groupware system users like name, given name, birthday, etc., and organizational information like company affiliation, job description, position in management organization, and relationships of reporting within the organization. On a general level, these attributes are handled as a set of labels or categories.

Contact information, or contact data, is presented to the user of the groupware system in the form of contact lists associated with the groupware system user, or by use of an address book application element. Typically, a groupware system user maintains a personal contact list (or a personal address book) in which the user can store and modify contact data about other groupware system users.

Personal contact lists can have a hierarchical structure and may contain multiple user groups or categories with each user category containing multiple users. Each user may belong to multiple categories and each category may contain multiple users.

However, generally, a groupware system user needs to carefully maintain his/her personal contact list in order to access correct and up-to-date information in a satisfying manner, thus requiring a substantial amount of effort.

Systems that allow (automatic) collection of "known contacts" by name or email address do not provide advanced search functionality, such as by the category of a groupware user, thus making it difficult to find an expert for a certain subject when the name of the person is not known. Further, systems that allow for automatic import of contact information from a corporate user directory do not provide complete and correct contact data about the user in a satisfying manner, because a corporate directory does not represent the rapidly changing business relationships and teamwork interactions that are characteristic for a complex matrix organization.

Consequently, there is a need for a groupware system, method, groupware server computer, groupware client computer, data processing program, computer program product, and computer data signal that automatically provides reliable, correct, and up to date contact data about groupware system users while correctly representing quickly changing and complex system user relationships.

SUMMARY

In a first aspect, there is provided a groupware computer system comprising a groupware server, a groupware client coupled to the server over a network, a contact information repository configured to store contact data of users in personal contact lists associated to individual users, a messaging system database configured to store statistical information about exchange of messages, a contact management module coupled to the contact information repository and configured to create, modify, and retrieve contact data of users, and an automatic determination of contact information (ADCI) module being configured to:

retrieve contact data of a first user by:
querying the contact information repository for all personal contact lists that contain contact data of a first user to obtain a set of relevant contact lists;
determining an owner of each relevant contact list;
determining a contact frequency of the owner of each relevant contact list with the first user; and
determining an age of contact data comprised in each relevant contact list;
calculate a ranking score for each relevant contact list from the contact frequency of its owner and the age of contact data comprised therein; and
select a set of contact data for the first user from a predetermined amount of relevant contact lists in order of descending ranking score.

By providing an automatic determination of contact information (ADCI) module, a functional component is provided that can effectively be incorporated into a groupware server computer as well as into a number of groupware client computers. Thus, the present invention can be used with a variety of existing groupware system architectures.

By having the ADCI module query the contact information repository for all personal contact lists that contain contact data of a first user, that is the user for which contact information is to be acquired, a set of relevant contact lists is obtained, which may be associated to a number of other groupware system users and which contain contact data of the first user as edited and categorized by the respective other groupware system users. Thus, contact information about the first user can be presented to a querying user automatically, and existing contact data about the first user that is contained in other users' personal contact lists can be reused. This is particularly advantageous in scenarios where a new user is added to the system with the new user not having any personal contact information yet, but being enabled to profit from the automated generation of contact data offered by the present invention. Another scenario where a user experiences advantages from the automated collection of contact data of a particular user, such as his professional expert categorization, is where a user receives a message from another groupware system user and the receiving user does not have any contact data (such as categorization information) stored in his personal contact data list. In this case, the system automatically retrieves available contact data from the personal contact lists of other groupware system users and thus provides accurate contact data to the receiving user.

By having the ADCI module determine the owner of each relevant contact list, determine the contact frequency of the owner with the first user, and determine the age of contact data comprised in each relevant contact list, measurement data are computed that enable to determine the accuracy and reliability of the automatically collected contact data. When a ranking score is calculated from the parameters such determined, a user to which collected contact data is supplied is additionally provided with information of the quality of the data, and automatic preselection is enabled for instance by selecting a predetermined number of contact data elements with the highest score values. For instance, the professional categorization of a personal contact list owner who very frequently exchanges messages with a (first) user about whom user categorization data is collected, and wherein the categorization information has consequently been updated rather recently, will obtain a higher ranking score and thus be selected by the system more likely or be placed in a preferred position when presented to a querying user.

In a second aspect, there is provided a method of contact data handling in a groupware computer system, comprising storing contact data of groupware system users in personal contact lists associated with individual groupware system users, the lists being stored in a contact information repository, and retrieving contact data of a first user, wherein retrieving the contact data of a first user comprises:

querying the contact information repository for all personal contact lists that contain contact data of the first user to obtain a set of relevant contact lists;

determining an owner of each relevant contact list;

determining a contact frequency of the owner of each relevant contact list with the first user;

determining an age of contact data comprised in each relevant contact list;

calculating a ranking score for each relevant contact list from the contact frequency of its owner and the age of contact data comprised therein; and selecting a set of contact data for the first user from a predetermined amount of relevant contact lists in the order of descending ranking score.

When the ADCI module and the contact management module are both located in the groupware server, the present invention is realized in an effective manner that enables low-effort maintenance and further enables integration of the present invention with an installed base of existing groupware clients.

When the ADCI module and the contact management module are comprised in one or a plurality of groupware clients each having an individual contact information repository coupled to it, it is enabled to have the personal contact lists distributed over the various contact information repositories in the individual groupware clients. Thus, it is enabled to keep the personal contact lists of a group of users locally on that groupware client computer on which the group of users operates, thus avoiding the need of large data repositories comprising the personal contact lists of all users and thus enabling to use small rather than large data stores and, at the same time, reducing network traffic resulting from data access to a central data repository.

In such a distributed scenario, an embodiment comprises an ADCI module that is further configured to query the contact information repository for all contacts of the first user to obtain a set of relevant contacts, determine the groupware clients of the relevant contacts, send a request to the groupware clients of the relevant contacts to retrieve the contact data of the first user, and aggregate retrieved contact data of the first user. In such an embodiment, the ADCI module is further configured to receive a request to retrieve the contact data of a first user, retrieve the contact data accordingly as specified for present invention, and transmit the contact data accordingly.

In such a configuration, the ADCI module of the groupware client computer of the user about which contact data is being queried forwards the contact data request to all groupware clients of the contacts in his contact list. These groupware clients carry out the method for collecting contact data in its respective contact information repository and return the results to the ADCI module of the groupware client of the user about which the data is to be collected. Then, the ADCI module may carry out the scoring and selecting of relevant contact data elements.

In a further embodiment of the present invention with a distributed contact data storage and retrieval configuration, the contact data comprise user categories (categories may be part of contact data in all other embodiments as well), and the ADCI module is further configured to select additional contacts of the same user category as the first user when retrieving contact data, and is further configured to execute retrieving of contact data recursively at the groupware clients of the additional contacts until a specified depth of recursion is reached. Thus, the search of contact information about a particular user is extended beyond the distribution to work group clients of other system users that are comprised in the personal contact list of the user about which contact data is queried. In this embodiment, the search is extended to be recursively carried out on all those groupware client systems of those users (contacts) that are comprised in the personal contact lists being stored on a work group client that are in the same category as the user about which contact data is being queried. For reasonably limiting such a recursive search, the recursion is discontinued as soon as a predetermined depth is reached.

To avoid processing cycles, an embodiment of the groupware system or the method discontinues processing upon determining that it is currently processing an identical request.

For further extending the set of contacts at whose groupware clients a request for contact data retrieval is sent, an embodiment of the present invention not only queries the contact information repository for all personal contact lists that contain contact data of the user in question, but also queries a messaging system database for all contacts of the first user to add to the set of relevant contacts.

For purposes of data protection and privacy, an embodiment of the present invention allows to include a visibility flag in the contact data and is configured such that a personal contact list is processed only on the condition of the visibility flag being set to true.

BRIEF DESCRIPTION OF DRAWINGS

The invention is further explained with reference to an exemplary embodiment and a number of drawings.

DETAILED DESCRIPTION

Figure 1:
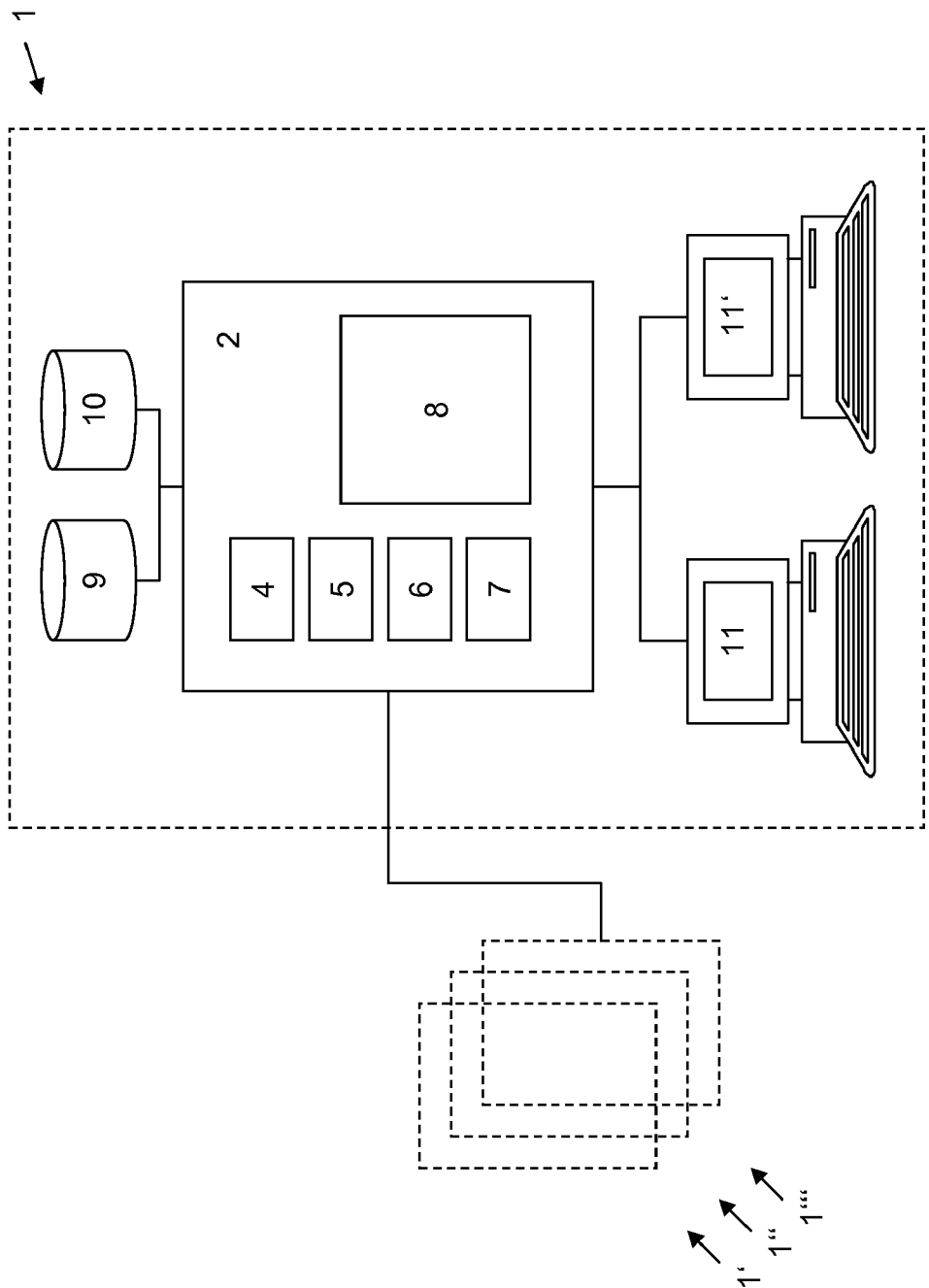
FIG. 1 shows a schematic block diagram of an embodiment with centralized contact data management.

FIG. 1 shows a schematic system overview of an embodiment of the present invention. Groupware system 1 comprises a groupware server computer 2 and groupware client computers 11 and 11'. Groupware server computer 2 is coupled to, or comprises, messaging system database 9 and contact information repository 10. Groupware server computer 2 may be coupled to other groupware systems 1', 1", or 1'", which may be also embodiments of present invention or different types of groupware systems.

Groupware server computer 2 comprises a message transfer module 4 that transfers electronic messages, such as emails or instant messages, from a sender to a recipient, for instance two groupware system users, each at one of groupware client computers 11 and 11'. Further, the groupware server computer 2 contains a presence management module 5 that monitors the status of presence of groupware system users at the system.

The groupware server computer 2 also contains a session management module 6 that enables sessions between two or more users of the groupware system 1. The session management may implement a protocol like the session initiation protocol SIP. Message transfer module 4, presence management module 5, and session management module 6 may be able to interact with other groupware servers in groupware systems 1', 1", and 1'" by use of common protocols like SIP, thus enabling interaction between different groupware or messaging systems. Thus, a user of a given groupware system served by groupware server computer 2 is able to communicate with another user of a different groupware system served by a groupware server in groupware system 1'. The message transfer module 4 of groupware server computer 2, as well as other components of the messaging subsystem of a groupware server, save statistical information about exchange of messages in messaging system database 9. This statistical information may include the number of communications between any two users, as well as the time of communication, the time of the last communication that occurred between two users, or the number of communications in the last five, ten, or any other number of days.

Groupware client computers 11 and 11' comprise a user interface (not shown) to edit, read, send, and receive electronic messages. The user interface further shows information about the status of presence of users at the system (user online/user available), and contact data for instance in the form of a contact list or a virtual address book. This information may be shown either graphically or in text form. In the embodiment of FIG. 1 contact data handling is centrally handled at the groupware system 1. Consequently, the groupware server computer 2 is coupled to a contact information repository 10, and further comprises contact management module 7 and automatic determination of contact information (ADCI) module 8. Contact management module 7 provides functionality to create, modify, and retrieve information about groupware system users. The contact data is stored in a contact information repository 10. The contact information repository 10 may also be replicated to groupware clients for being locally accessed by the groupware clients; those embodiments are such that both groupware server and groupware clients comprise contact management modules 7 and contact information repositories 10 with database replication functionality ensuring that the set of data stored in all databases is identical and up to date. Moreover, in such scenarios with replicated contact information repository, client contact management and server contact management interact by use of a dedicated protocol or a message transfer protocol or session management protocol that is extended to handle contact information.

In alternative embodiments to those shown in the figures, ADCI module 8 may be integrated in contact management module 7 instead of being a separate component.

In both the central data storage embodiment and the replicated data storage embodiments, contact management module 7 and ADCI module 8 may operate either locally on the server or locally on each groupware client that has a replicated copy of the contact information repository 10, as will be explained with reference to FIG. 3 later.

Figure 2:
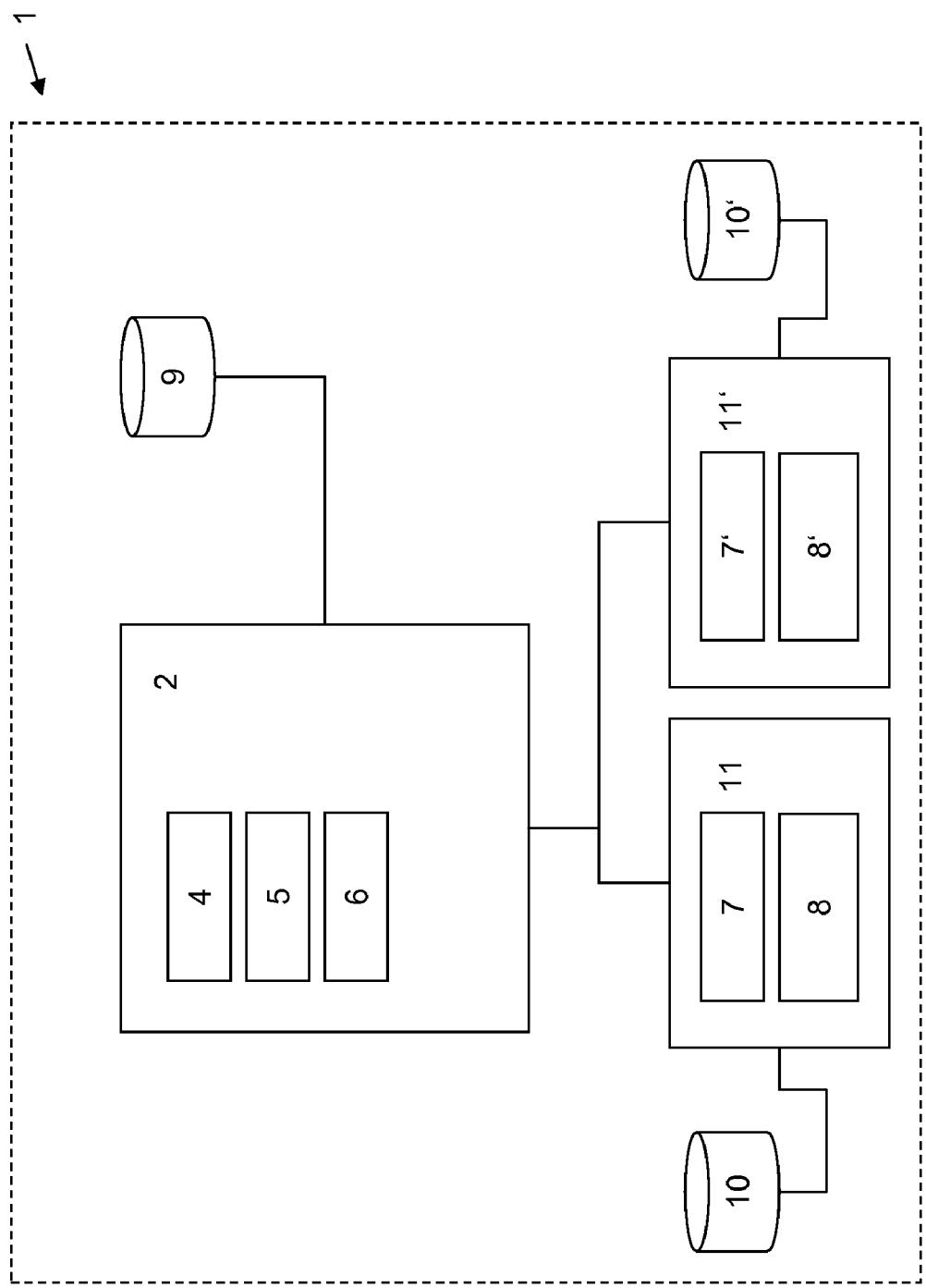
FIG. 2 shows a schematic block diagram of an embodiment with decentralized contact data management.

FIG. 2 shows an embodiment of the present invention with groupware system 1 again comprising groupware server computer 2 and a number of groupware client computers 11 and 11', where identical reference numbers refer to similar components as described with regard to FIG. 1.

In this embodiment, however, groupware client computers 11 and 11' each comprise a contact management module 7, or 7', respectively, an ADCI module 8, or 8', respectively, and are coupled to a contact information repository 10, or 10', respectively.

The groupware server computer 2 does not comprise a contact management module 7 or ADCI module 8. Like the groupware system 1 of FIG. 1, the groupware system of present embodiment may be coupled to other groupware systems (not shown).

In this embodiment, contact data stored in personal contact data lists of groupware system users are distributed over various groupware client computers 11, 11', etc., so that each contact information repository 10, 10', etc. typically has only a subset of data stored (as opposed to embodiments with replicated central data bases). Operation of this embodiment will be described with reference to FIGS. 4 and 5 later.

Figure 3:
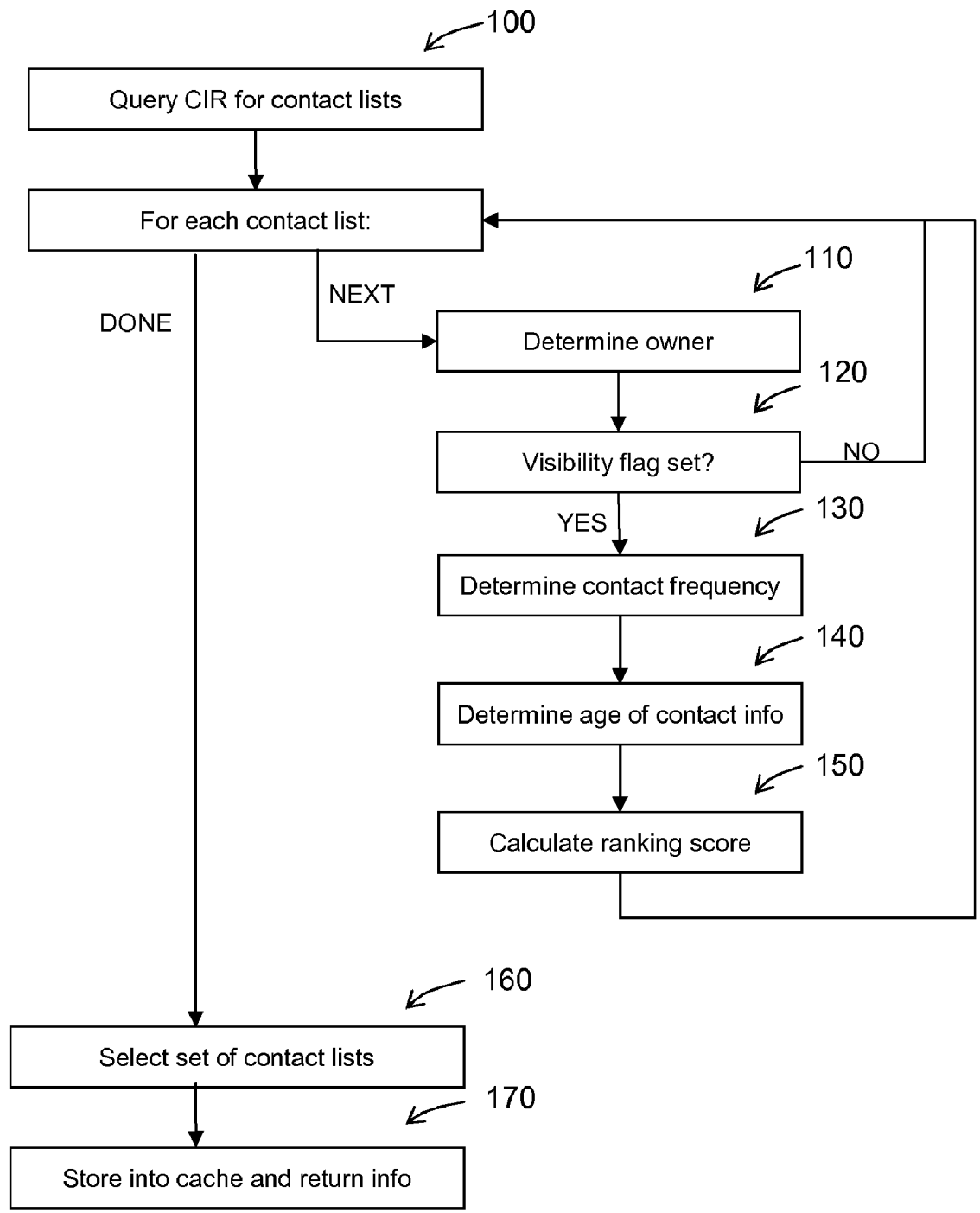
FIG. 3 shows a simplified flow diagram of the operation of the embodiment of FIG. 1.

When performing either on a central groupware server and a central contact information repository, or on a local full replica of such a contact information repository on a client, ADCI module 8 is configured to operate as shown in the simplified flow diagram of FIG. 3.

First, the ADCI module 8 queries the contact information repository 10 for all personal contact lists that contain contact information about a particular system user about whom contact data is to be produced, e.g., "first user", "user X", in 100. Then, for each contact list thus obtained, 110 to 150 are carried out as follows.

First, the owner of the contact list subject to the present iteration cycle is determined in 110. Then, the ADCI module 8 determines if the Boolean visibility flag comprised in the contact list data record is set to true in 120. By setting the visibility flag, the owner of a personal contact list can control if her contact list is readable by others and can be accessed by present invention. If the visibility flag is not set, or set to false, the present iteration cycle is discontinued and the next iteration cycle is started on the next personal contact list. If, however, the visibility flag is set to true, the contact frequency between the owner of the personal contact list and user X is determined in 130. Further, the age of the contact information comprised in the personal contact list of the present iteration cycle is determined in 140, and, from the age of the contact information and the determined contact frequency, the ADCI module calculates a ranking score for this contact, i.e., the user that is the owner of the personal contact list, in 150. Then, the next iteration cycle is started on the next available contact list. When no further contact list is available, so that the iteration over all contact lists is completed, a set of a predetermined amount of categories with the highest scores is selected by the ADCI module 8, in the order of decreasing ranking score in 160. Finally, in 170 the contact information thus obtained is stored into a cache memory, and the contact information, that is the set of categories resulting from 160, is returned. The amount of categories that are selected can be set as a configurable parameter, e.g., any natural number.

Figure 4:
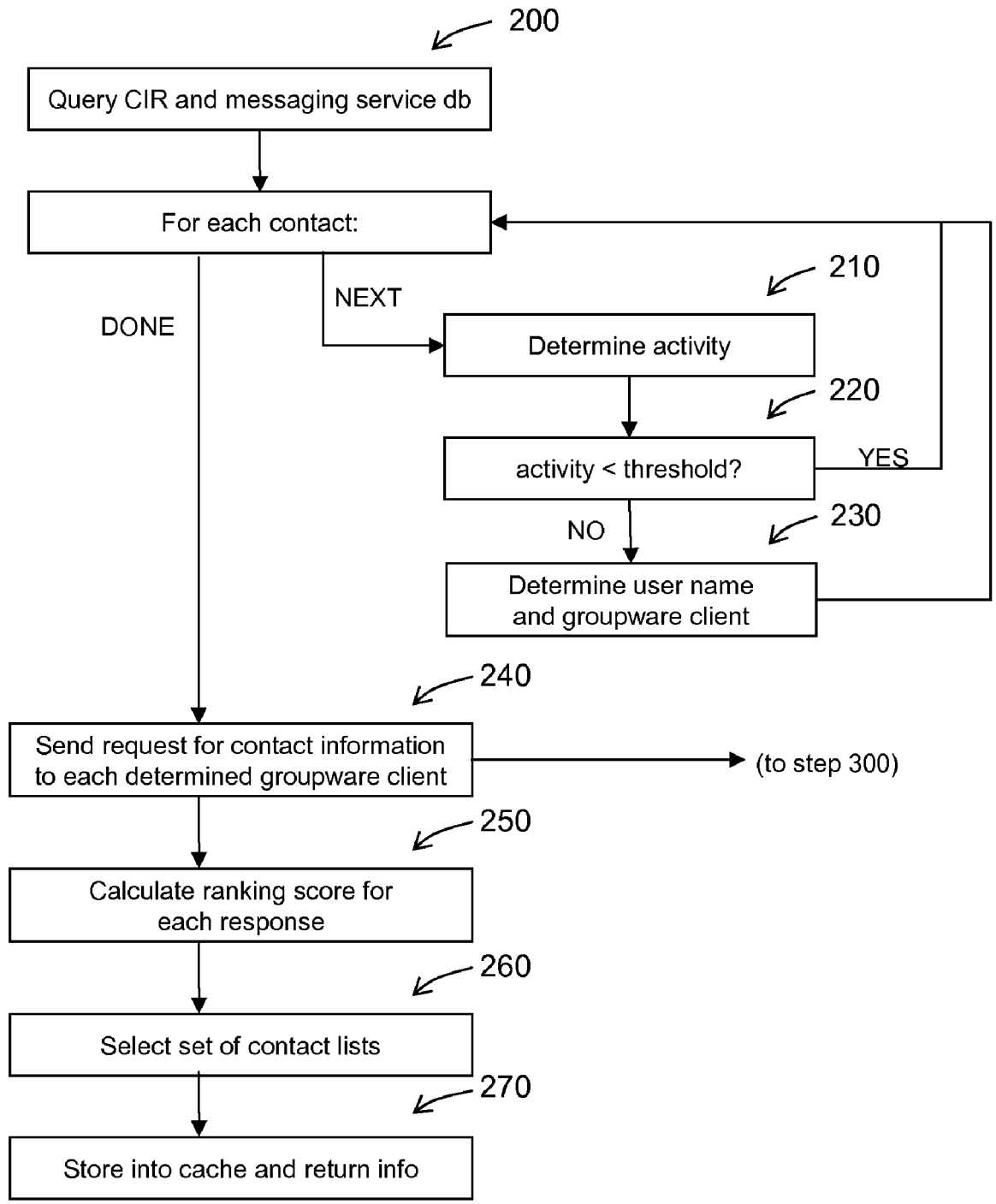
FIG. 4 shows a simplified block diagram of request generation and distribution in the embodiment of FIG. 2.
Figure 5:
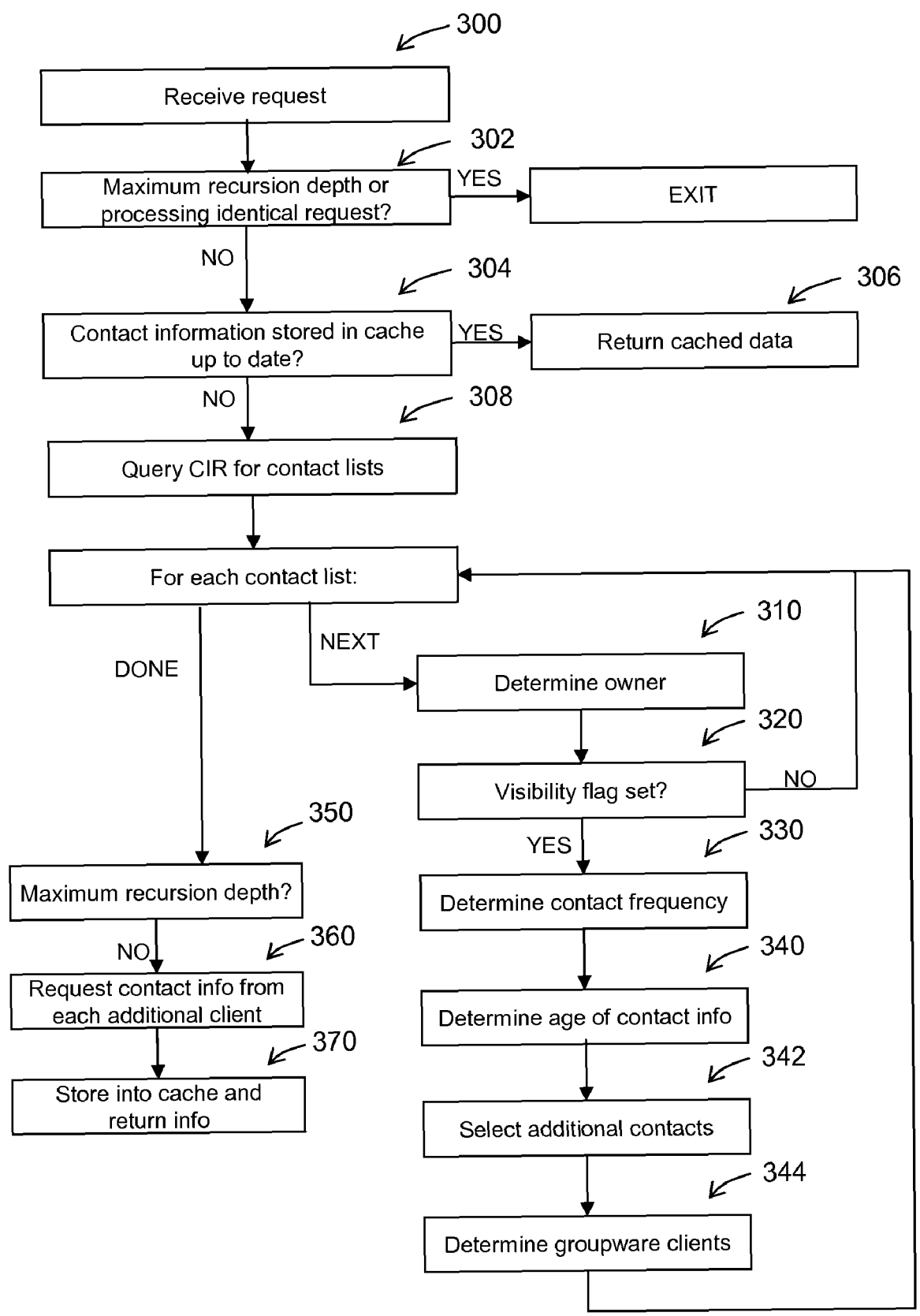
FIG. 5 shows a simplified flow diagram of the operation of contact data acquisition and recursive request forwarding in the embodiment of FIG. 2.

The operation of embodiments with distributed storage of personal contact lists, as in FIG. 2, will now be described with reference to FIGS. 4 and 5.

In 200, the ADCI module 8 of the groupware client computer 11 of user X (i.e., the user about who information is to be retrieved) queries its local contact information repository 10 and the messaging statistics database 9 (as shown in FIG. 2) for a set of contacts of user X (i.e., for a set of groupware system users that are stored in user X's personal contact list or of which the messaging statistics database finds information about exchanged messages in the past). Then, a distance control value is initialized to the number of 1 and, for each contact, 210 to 230 are performed as follows.

First, the messaging activity of the contact processed in the current iteration cycle is determined in 210. With the present invention, "activity" represents a measure of the recent messaging activity between user X and the contact of the current iteration. This allows contacts with low messaging activity to be skipped by comparing the measure and a configurable threshold value.

Then, it is determined if activity is less than the "threshold" value in 220. If so, the current iteration cycle is discontinued, and a new iteration cycle is started with the next available contact. If activity is not less than threshold, the user name of the contact of the current iteration cycle and the groupware client belonging to the contact are determined in 230, and the messaging client is stored into a temporary storage. Then, a new iteration cycle is started on the next available contact. If no further contact is available and the iteration over all available contacts has thus been completed, a request for contact data about user X is sent to each messaging client stored in the temporary storage. Upon reception of the appropriate responses containing a set of categories, age of contact data and communication frequency between the owner of personal contact lists and user X, a ranking score is calculated for each response in 250, and the set of contact lists is selected in 260 in a similar manner to 150 and 160 described with reference to FIG. 3. Finally, the information is stored into a cache memory and the information is returned in 270.

In 300, the ADCI module of each groupware client computer receiving the request issued in 240 is accepted, and the parameters transmitted with the request (distance value, user ID, requester) are taken over by the local ADCI of the executing groupware client computer of the particular contact. In the present invention, "distance value" represents the distance between requester and current groupware client serving as a measure of the recursion depth. "User ID" identifies the user for whom the contact information is sought, and "requester" identifies the "initial" messaging client seeking the contact information.

In 302, it is determined if the maximum recursion depth has been reached (distance value is greater than predefined threshold value) or if an identical request is being processed already. If maximum recursion depth has been reached or an identical request is currently being processed, the local ADCI discontinues processing and appropriately responds to the ADCI of user X.

In 304, it is determined if the contact information to be retrieved is already stored in the cache memory and if this cached information is up to date. If so, the cached data will be returned in 306 and the further processing ends for the local ADCI regarding this request.

If the contact information is not stored in the cache memory or the cache memory is out of date, the local contact information repository is queried for personal contact lists containing contact information about user X, as described for 100 with regard to FIG. 3. Then, for each contact list thus obtained, 310 to 344 are executed, wherein 310 to 340 correspond to 110 to 140 as described with reference to FIG. 3. Moreover, in 342 additional contacts contained in the contact list subject to the present cycle of iteration are selected where a contact being contained in the contact list is of the same category as the user X. Then, in 344, the respective groupware clients of the additional contacts are determined and stored in a temporary storage.

After this, a new iteration cycle is started with the next contact list available. If no further contact list is available, and thus the iteration has been completed, it is determined if the maximum recursion depth is reached in 350. If not, for each messaging client stored in the temporary table containing the groupware clients of additional contacts, a recursive request for contact information from the additional client is sent to the additional client, passing the distance value incremented by 1, user X, and the requester ID to the ADCI of the respective groupware client, which then starts with 300 again.

If the maximum recursion depth has been reached, no additional requests are made. In both cases, finally, the acquired information is stored into the cache memory, and the information is returned in 370.

The following use case for the present invention is typical for embodiments with centralized or replicated contact information storage as well as for embodiments with distributed storage of contact information. When a new message is received at groupware client computer 11 via message transfer module 4, the groupware client invokes contact management module 7 to retrieve contact information about the message sender. The contact management module 7 queries the contact information repository 10 to retrieve the appropriate contact information about the message sender. If information can be found, contact management module 7 returns the appropriate contact information about the message sender to the receiving groupware client computer 11 which in turn invokes its user interface to display the contact data appropriately. If the contact management module 7 does not find contact information, it invokes the ADCI module 8 to retrieve the contact information of the message sender, passing the user ID of the message sender as a parameter. After obtaining the contact information as described with regard to FIGS. 3 to 5, contact management module 7 stores the data returned by the ADCI module 8 into the contact information repository and returns the contact information to the receiving messaging client which in turn invokes its user interface to display the contact information appropriately.

Another practical application of the present invention is to periodically update the contact information repository 10 by invoking the ADCI module 8 to obtain up to date contact information. In this case, contact management module 7 periodically queries the contact information repository for a set of contact information and for each item in the set of contact information determines whether the contact information needs to be updated, for example of the stored information is older than a specified age. For contact information items that need to be updated, contact management module 7 invokes ADCI component 8 to retrieve contact information and then stores the data returned by the ADCI component into a contact information repository 10. Thus, after iterating over the complete set of contact information, the contact data stored in the contact information repository 10 is automatically kept up to date.

Further, it is enabled to provide a large amount of contact information to a new user based on the information stored in existing personal contact lists by retrieving and reusing contact information already entered by the other users of the system.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To avoid unnecessary repetitions, explanations given for one of the various embodiments are intended to refer to the other embodiments as well, where applicable. Reference signs in the claims shall not be construed as limiting the scope. The use of "comprising" in this application does not mean to exclude other elements or steps and the use of "a" or "an" does not exclude a plurality. A single unit or element may fulfill the functions of a plurality of means recited in the claims.

Some/all aspects of the present invention can be provided on a computer-readable medium that includes computer program code for carrying out and/or implementing the various process steps of the present invention, when loaded and executed in a computer system. It is understood that the term "computer-readable medium" comprises one or more of any type of physical embodiment of the computer program code. For example, the computer-readable medium can comprise computer program code embodied on one or more portable storage articles of manufacture (e.g., a compact disc, a magnetic disk, a tape, etc.), and/or on one or more data storage portions of a computer system, such as memory and/or a storage system (e.g., a fixed disk, a read-only memory, a random access memory, a cache memory, etc.).

It should be appreciated that the teachings of the present invention could be offered as a business method on a subscription or fee basis. For example, a service provider can create, maintain, enable, and deploy an audience response detection interactive presentation tool, as described above.

The foregoing description of the preferred embodiments of this invention has been presented for purposes of illustration and description. It is not intended to be exhaustive or to limit the invention to the precise form disclosed, and obviously, many modifications and variations are possible.

REFERENCE NUMERALS

1 Groupware system
2 Groupware server
4 Message transfer module
5 Presence management module
6 Session management module
7 Contact management module
8 ADCI module
9 Messaging system database
10 Contact information repository
11, 11' Groupware client
100 Query CIR for contact lists
110 Determine owner
120 Visibility flag set?
130 Determine contact frequency
140 Determine age of contact info
150 Calculate ranking score
160 Select set of contact lists
170 Store into cache and return info
200 Query CIR and messaging service db
210 Determine activity
220 Activity<skip?
230 Determine user name and messaging client
240 Send request for contact information to each determined messaging client
250 Calculate ranking score for each response
260 Select set of contact lists
270 Store into cache and return info
300 Receive request
302 Maximum recursion depth or processing identical request?
304 Contact information stored in cache up to date?
306 Return cached data
308 Query CIR for contact lists
310 Determine owner
320 Visibility flag set?
330 Determine contact frequency
340 Determine age of contact info
342 Select additional contacts
344 Determine groupware clients
350 Maximum recursion depth?
360 Request contact info from each additional client
370 Store into cache and return info

The invention claimed is:

1. A groupware computer system comprising:
a groupware server;
a groupware client coupled to the server over a network;
a contact information repository configured to store contact data of users in personal contact lists associated to individual users;
a contact management module coupled to the contact information repository and configured to create, modify, and retrieve contact data of users; and an automatic determination of contact information (ADCI) module being configured for:
- querying the contact information repository for all personal contact lists that contain contact data of a first user to obtain a set of relevant contact lists;
- determining an owner of each relevant contact list, wherein the owner sets a status of a visibility flag, wherein the status is selected from a group consisting of: true and false, and wherein the visibility flag controls access to the relevant contact list;
- determining the status;
- determining a contact frequency of the owner of one of the relevant contact list from the set of relevant contact lists with the first user in response to determining the status as true;
- selecting a next relevant contact list in response to determining the status as false;
- determining an age of contact data comprised in each relevant contact list;
- calculating a ranking score for each relevant contact list from the contact frequency of its owner and the age of contact data comprised therein;
- selecting a predetermined amount of relevant contact lists in order of descending ranking score; and
- retrieving contact data of the first user from the predetermined amount of relevant contact lists.

2. The system according to claim 1, wherein the ADCI module and the contact management module are comprised in the groupware server.

3. The system according to claim 1, wherein the ADCI module and the contact management module are comprised in the groupware client, and the contact information repository is coupled to the contact management module at the groupware client.

4. The system according to claim 3, further comprising a plurality of the groupware clients, wherein the personal contact lists are distributed over a number of contact information repositories coupled to the individual groupware clients, wherein the ADCI module is further configured to:
- query the contact information repository for all contacts of the first user to obtain a set of relevant contacts;
- determine the groupware clients of the relevant contacts;
- send a request to the groupware clients of the relevant contacts to retrieve the contact data of the first user; and
- aggregate retrieved contact data of the first user,
- wherein the ADCI module is further configured to receive a request to retrieve the contact data of a first user and transmit the contact data accordingly.

5. The system according to claim 4, wherein the contact data comprise user categories and wherein the ADCI module is further configured to select additional contacts of the same user category as the first user when retrieving contact data, and is further configured to execute retrieving of contact data recursively at the groupware clients of the additional contacts until a specified depth of recursion is reached.

6. A method for contact data handling in a groupware computer system, comprising:
- storing contact data of groupware system users in personal contact lists associated with individual groupware system users, the lists being stored in a contact information repository; and
- retrieving contact data of a first user, wherein retrieving the contact data of a first user comprises:
  - querying the contact information repository for all personal contact lists that contain contact data of the first user to obtain a set of relevant contact lists;
  - determining an owner of each relevant contact list, wherein the owner sets a status of a visibility flag, wherein the status is selected from a group consisting of: true and false, and wherein the visibility flag controls access to the relevant contact list;
  - determining the status;
  - determining a contact frequency of the owner of one of the relevant contact list from the set of relevant contact lists with the first user in response to determining the status as true;
  - selecting a next relevant contact list in response to determining the status as false;
  - determining an age of contact data comprised in each relevant contact list;
  - calculating a ranking score for each relevant contact list from the contact frequency of its owner and the age of contact data comprised therein;
  - selecting a predetermined amount of relevant contact lists in the order of descending ranking score; and
  - retrieving contact data of the first user from the predetermined amount of relevant contact lists.

7. The method according to claim 6, wherein the personal contact lists are distributed over a number of contact information repositories coupled to individual groupware clients, and wherein the ADCI module of the groupware client of the first user is further configured to:
- query the contact information repository for all contacts of the first user to obtain a set of relevant contacts;
- determine the groupware clients of the relevant contacts;
- send a request to the groupware clients of the relevant contacts to retrieve the contact data of the first user; and
- aggregate retrieved contact data of the first user;
- wherein the retrieving of contact data of the first user is performed on the respective groupware clients of the relevant contacts.

8. The method according to claim 7, wherein the contact data comprise user categories, the retrieving of contact data further comprising:
- selecting additional contacts of the same user category as the first user, and wherein the retrieving of contact data is executed recursively by the groupware clients of the additional contacts until a specified depth of recursion is reached.

9. The method according to claim 7, wherein a groupware client discontinues processing upon determining that it is currently processing an identical request.

10. The method according to claim 7, further comprising:
- querying a messaging system database for all contacts of the first user to add to the set of relevant contacts.

11. The method according to claim 6, wherein the contact data contain a visibility flag and a contact data element is processed only if the visibility flag is set to TRUE.

12. A program product stored on a computer readable storage medium, which when executed, handles contact data in a groupware computer system, the computer readable storage medium comprising program code for:
- storing, in a contact information repository, contact data of users in personal contact lists associated to individual users;
- retrieving contact data of a first user by:
  - querying the contact information repository for all personal contact lists that contain contact data of a first user to obtain a set of relevant contact lists;
  - determining an owner of each relevant contact list, wherein the owner sets a status of a visibility flag, wherein the status is selected from a group consisting of: true and false, and wherein the visibility flag controls access to the relevant contact list;

determining the status;

determining a contact frequency of the owner of each relevant contact list with the first user one of the relevant contact list from the set of relevant contact lists with the first user in response to determining the status as true;

selecting a next relevant contact list in response to determining the status as false;

determining an age of contact data comprised in each relevant contact list;

calculating a ranking score for each relevant contact list from the contact frequency of its owner and the age of contact data comprised therein;

selecting a predetermined amount of relevant contact lists in order of descending ranking score; and retrieving contact data of the first user from the predetermined amount of relevant contact lists.

13. The system of claim 1 further comprising, wherein the visibility flag is a Boolean visibility flag.

* * * * *